(12) United States Patent
Peron et al.

(10) Patent No.: US 12,126,266 B2
(45) Date of Patent: Oct. 22, 2024

(54) METHOD AND DEVICE FOR CONVERTING A VOLTAGE WITH SOFT SWITCHING OF THE SWITCHES

(71) Applicant: Forsee Power, Ivry-sur-seine (FR)

(72) Inventors: Benoît Peron, Tours (FR); Arnaud Bruder, Lyons (FR)

(73) Assignee: FORSEE POWER, Ivry-sur-Seine (FR)

( * ) Notice: Subject to any disclaimer, the term of this patent is extended or adjusted under 35 U.S.C. 154(b) by 72 days.

(21) Appl. No.: 17/793,594

(22) PCT Filed: Jan. 7, 2021

(86) PCT No.: PCT/FR2021/050020
§ 371 (c)(1),
(2) Date: Jul. 18, 2022

(87) PCT Pub. No.: WO2021/144521
PCT Pub. Date: Jul. 22, 2021

(65) Prior Publication Data
US 2023/0139340 A1 May 4, 2023

(30) Foreign Application Priority Data

Jan. 16, 2020 (FR) .................................. 2000401

(51) Int. Cl.
*H02M 3/335* (2006.01)
*H02M 1/00* (2006.01)
(Continued)

(52) U.S. Cl.
CPC ..... *H02M 3/33573* (2021.05); *H02M 1/0058* (2021.05); *H02M 1/083* (2013.01); *H02M 3/01* (2021.05); *H02M 3/33576* (2013.01)

(58) Field of Classification Search
CPC ...... H02M 1/0058; H02M 1/083; H02M 3/01; H02M 3/335; H02M 3/3373; H02M 3/33576
See application file for complete search history.

(56) References Cited

U.S. PATENT DOCUMENTS 6,072,856 A * 6/2000 Van Der Broeck ......................... H02M 3/33573 363/71
6,246,594 B1 * 6/2001 Matsuda ........... H02M 3/33573 363/17
(Continued)

FOREIGN PATENT DOCUMENTS

DE 102012215293 A1 4/2014

OTHER PUBLICATIONS

International Search Report for International Application No. PCT/FR2021/050020; Date of Completion: Mar. 3, 2021; Date of Mailing: Mar. 17, 2021; 4 Pages.
(Continued)

*Primary Examiner* — Gary L Laxton
(74) *Attorney, Agent, or Firm* — CANTOR COLBURN LLP

(57) ABSTRACT

A method for converting an input voltage ($V_{in}$) of a converter (1) into an output voltage ($V_{out}$), the circuit comprising a first bridge arm consisting of two switches (A) and (B), a second bridge arm consisting of two switches (C) and (D), connected in parallel, a primary coil coupled to a secondary coil, and connected by a center point pole (PAB) of the first bridge arm, and by another center point pole (PCD) of the second bridge arm; the circuit further comprising a capacitor in parallel between the respective terminals of each of the switches (A, B, C, D); a third bridge arm formed by two switches (E) and (F), connected in series; each of the switches (A, B, C, D, E, F) being associated with a diode at (Continued)

the terminals of said switch; an injection inductance ($L_{inj}$) connected to the center point ($P_{AB}$) of the first bridge arm, and to the center point ($P_{EF}$) of the third bridge arm; a monitoring-control unit configured to control the switches to turn them ON or OFF, according to a control cycle configured to ensure soft switching between ON and OFF.

15 Claims, 9 Drawing Sheets

(51) Int. Cl.
*H02M 1/08* (2006.01)
*H02M 3/00* (2006.01)

(56) References Cited

U.S. PATENT DOCUMENTS

| | | |
|---|---|---|
| 9,548,668 B2 * | 1/2017 | Fu .................... H02M 3/33592 |
| 2009/0251927 A1 | 10/2009 | Popescu et al. |

OTHER PUBLICATIONS

Translation of International Search Report for International Application No. PCT/FR2021/050020; Date of Completion: Mar. 3, 2021; Date of Mailing: Mar. 17, 2021; 2 Pages.

Written Opinion for International Application No. PCT/FR2021/050020; Date of Mailing: Mar. 17, 2021; 12 Pages.

Translation of Written Opinion for International Application No. PCT/FR2021/050020; Date of Mailing: Mar. 17, 2021; 7 Pages.

* cited by examiner

Fig. 3.1
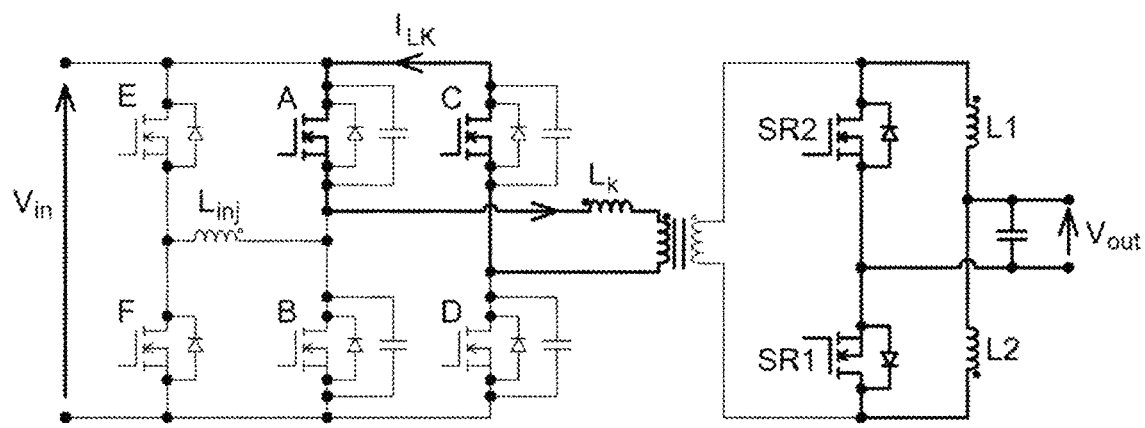
Fig. 3.2
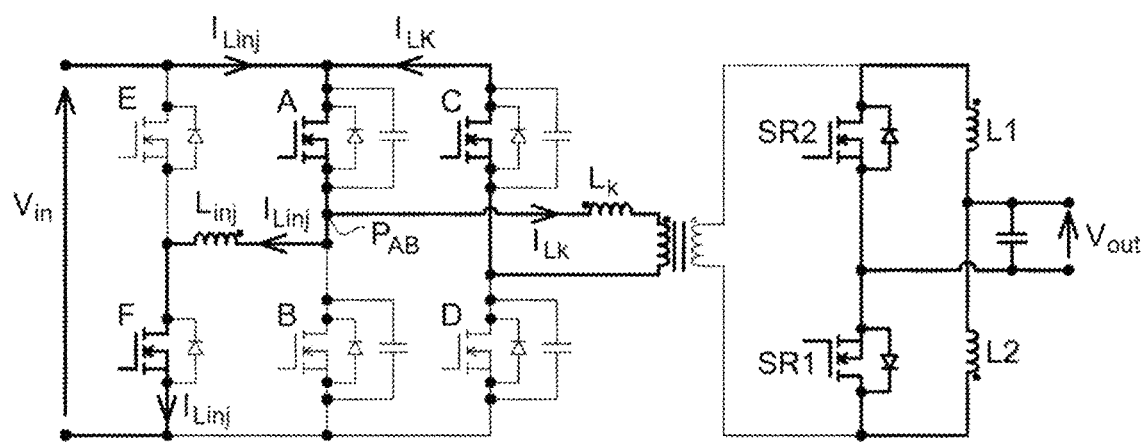

Fig. 3.3
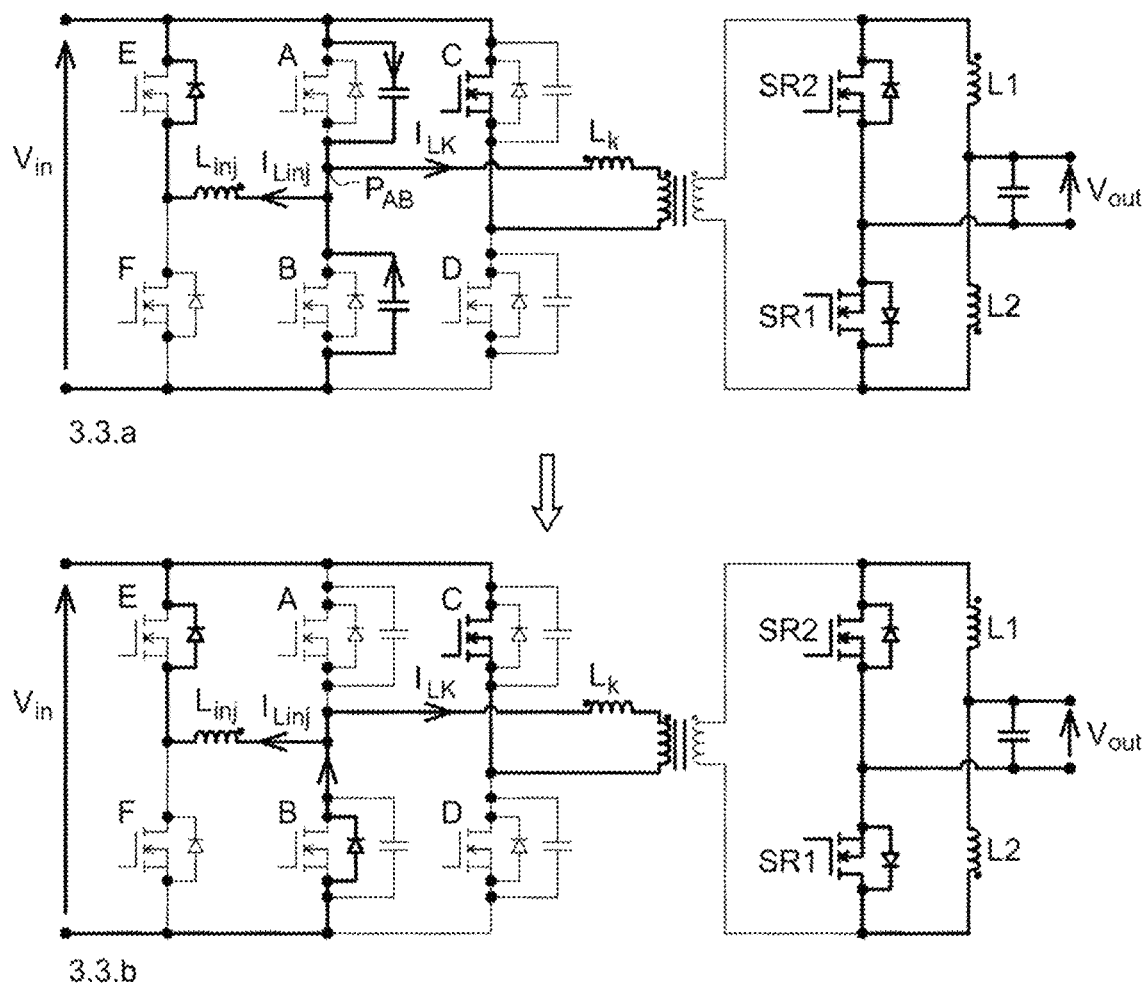

Fig. 3.4
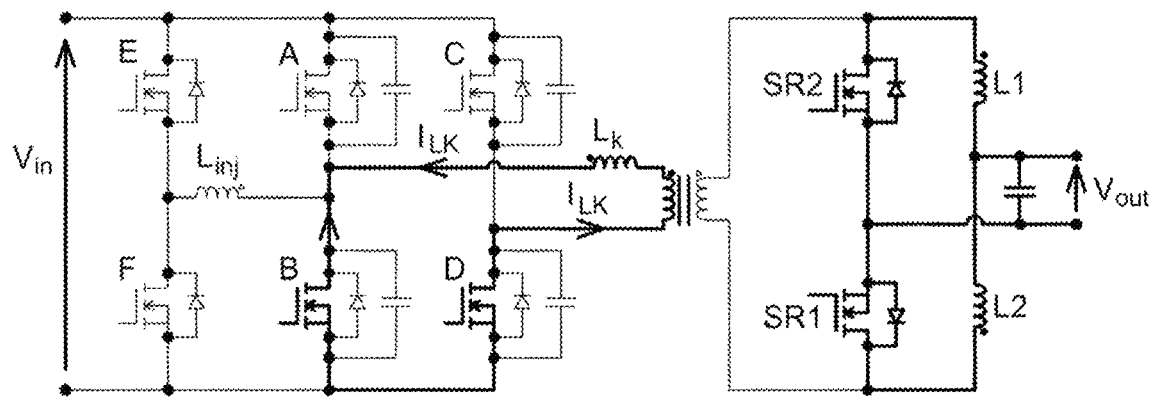
Fig. 3.5
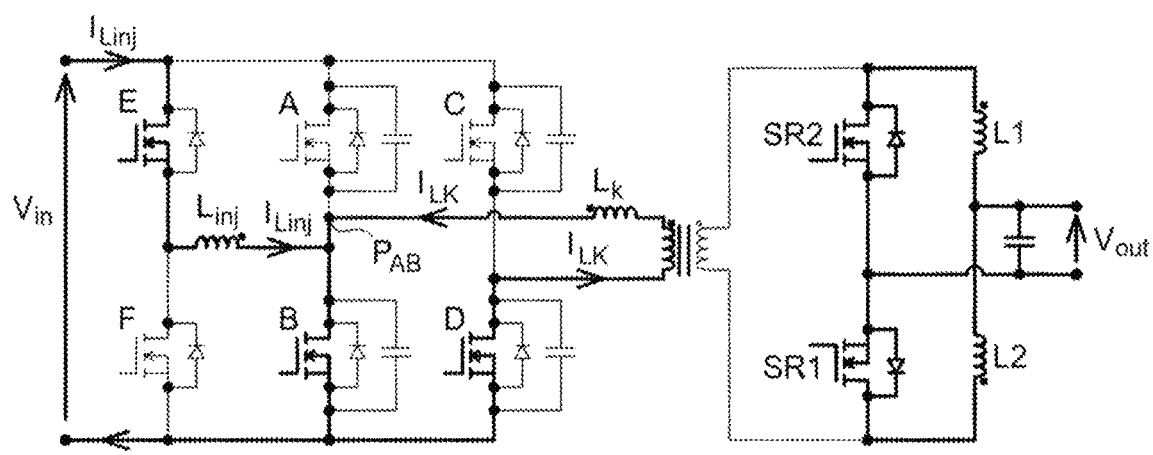

Fig. 3.6
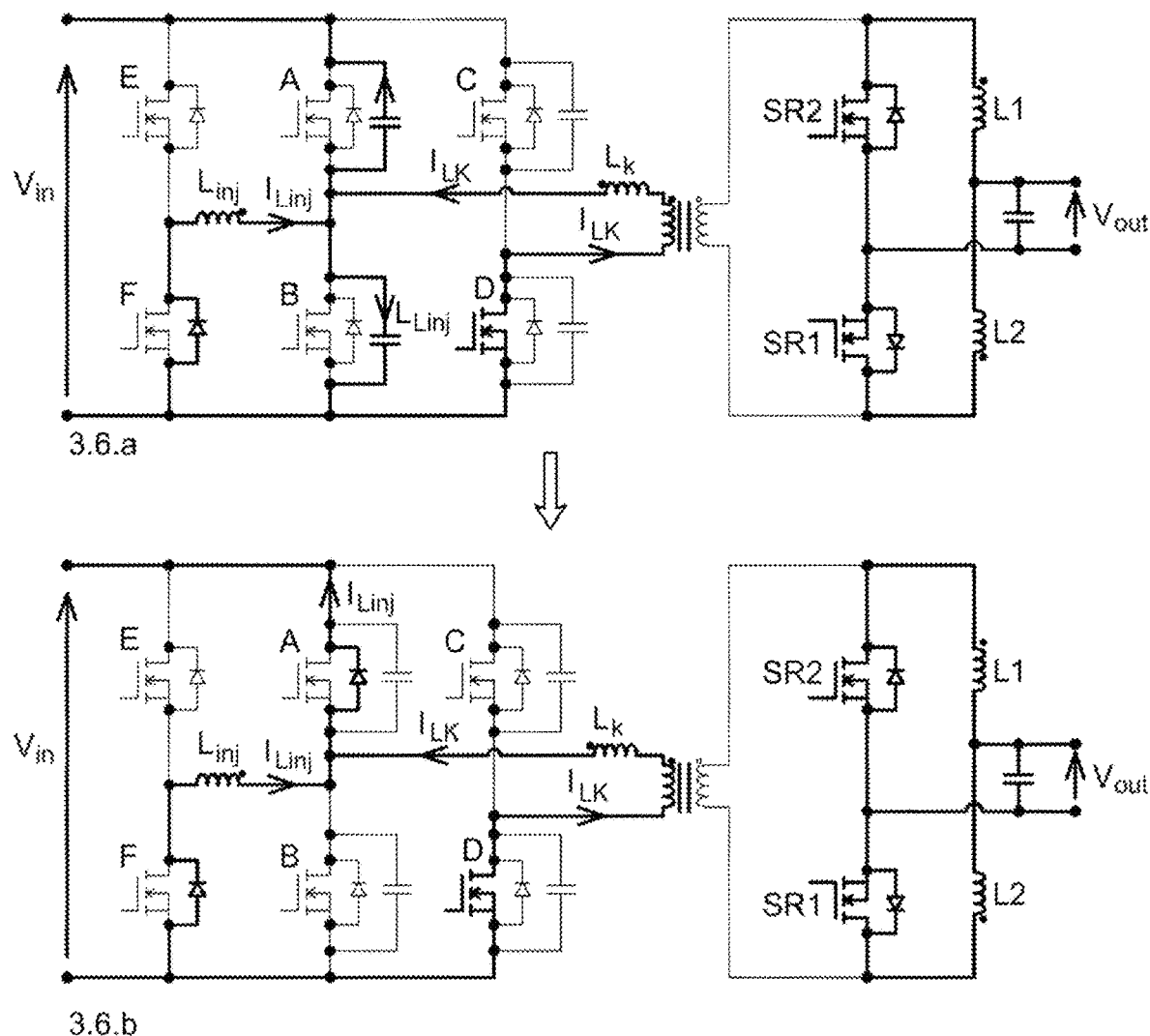
3.6.a
3.6.b

Fig. 5
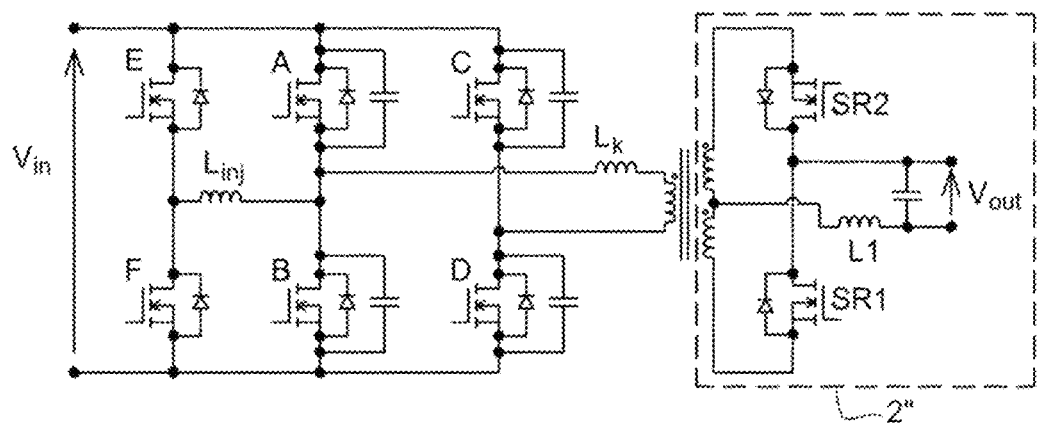
Fig. 6
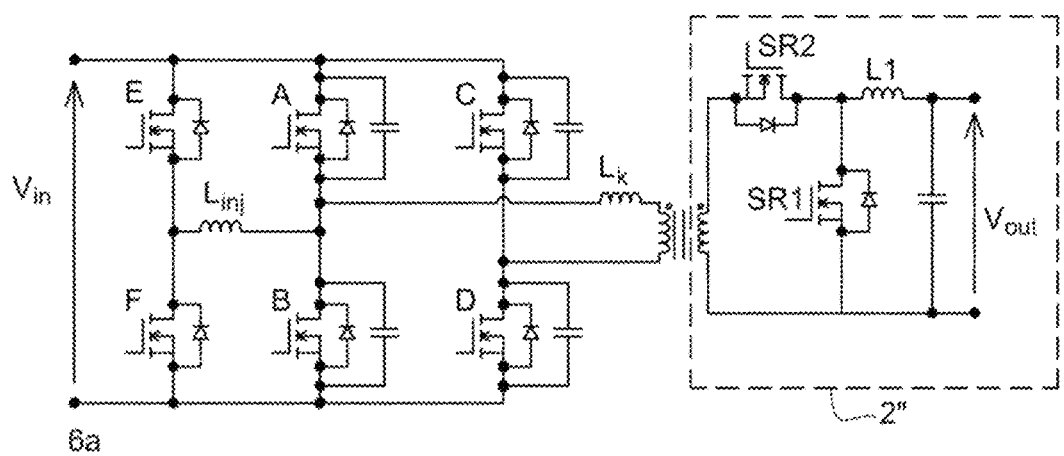
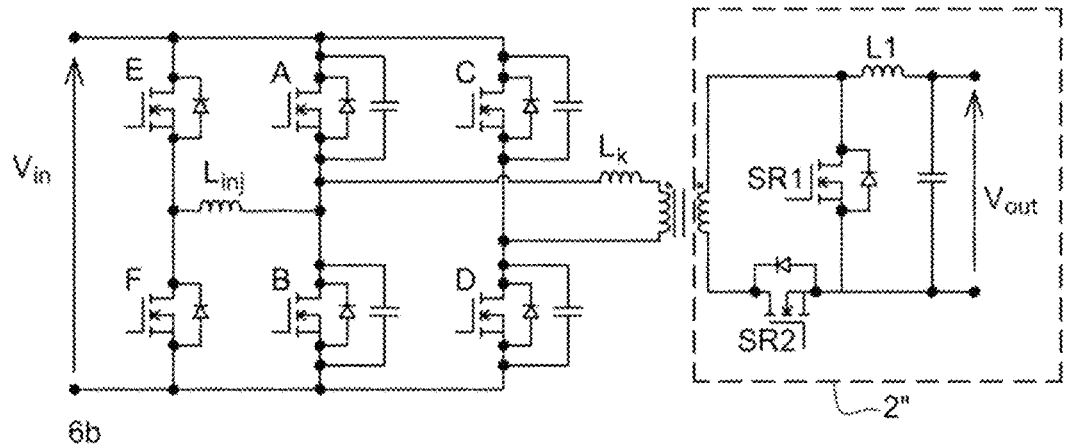

METHOD AND DEVICE FOR CONVERTING A VOLTAGE WITH SOFT SWITCHING OF THE SWITCHES

CROSS REFERENCE TO RELATED APPLICATIONS

This application is a National Stage of PCT Application No. PCT/FR2021/050020 filed on Jan. 7, 2021, which claims priority to French Patent Application No. 20/00401 filed on Jan. 16, 2020, the contents each of which are incorporated herein by reference thereto.

TECHNICAL FIELD

The present invention concerns the field of DC-DC converters, and in particular converters which include a transformer providing a galvanic isolation.

BACKGROUND

The known DC-DC converters are based on the use of full-bridge switching cells, coupled with a transformer. A switching cell usually comprises a switch and a capacitor.

The switching cells are configured for soft switching, i.e. with zero voltage across the terminals of the switch when closing and opening said switch, in other words respectively when switching ON and switching OFF said switch. Nevertheless, with converters of the state of the art, soft switching is only effective when closing, i.e. when turning ON, the switch, and is not effective when opening, in other words when turning OFF, the switch. Furthermore, the operating range of known DC-DC converters is limited to output currents and transferred powers which must be greater than a minimum level; thus, when a converter of the state of the art is coupled to a small load, which requires an operating power and current lower than these minimum levels, the soft switching is no longer possible. Therefore, the discharge of the capacitor of the switching cell in the switch deteriorates the switch and alters the reliability of the converter; moreover, the steepness of the voltage edges is not as reduced as it could be, which induces electromagnetic disturbances emitted by the converter; finally, potentially destructive over-voltages appear at the terminals of the power transistors of the switching cells.

BRIEF SUMMARY

Hence the invention aims at suggesting a solution to all or part of these drawbacks.

To this end, the present invention concerns a method for converting an input voltage between two input terminals of a primary circuit of a converter into an output voltage between two output terminals of a secondary circuit of the converter, the primary circuit comprising:

a first bridge arm consisting of a first switch and a second switch, the first and second switches being connected in series between the input terminals of the primary circuit, a first center point of the first bridge arm designating an intermediate connection point between the first switch and the second switch;

a second bridge arm consisting of a third switch and a fourth switch, the third and fourth switches being connected in series between the input terminals of the primary circuit, a second center point of the second bridge arm designating an intermediate connection point between the third switch and fourth switches, the second bridge arm being connected in parallel with the first bridge arm between the input terminals of the primary circuit;

a primary coil of the primary circuit, the primary coil comprising a leakage inductance, the primary coil being coupled by mutual induction to a secondary coil of the secondary circuit, the primary coil being connected by a pole to the center point of the first bridge arm, and by another pole to the center point of the second bridge arm;

the primary circuit further comprising:

a capacitor disposed in parallel between the respective terminals of each of the first, second, third and fourth switches;

a third bridge arm consisting of a fifth switch and a sixth switch, the fifth and sixth switches being connected in series between the input terminals of the primary circuit, a third center point of the third bridge arm designating an intermediate connection point between the fifth switch and the sixth switch, the third bridge arm being connected in parallel with the first and second bridge arms between the input terminals of the primary circuit;

each of the first, second, third, fourth, fifth and sixth switches being associated with a diode connected to the terminals of said first, second, third, fourth, fifth and sixth switches;

an injection inductance connected by one pole to the center point of the first bridge arm, and by another pole to the center point of the third bridge arm;

a monitoring-control unit configured to control a state of the switches, each switch being configured to be alternately switched ON or OFF, the monitoring-control unit being configured to implement a switch control cycle comprising the following steps:

setting the first switch to ON, at a first instant;

setting the fourth switch to OFF, at a second instant of the cycle:

setting the third switch to ON, at a third instant of the cycle;

setting the first switch to OFF, at a fourth instant of the cycle:

setting the second switch to ON, at the fifth instant of the cycle;

setting the third switch to OFF, at a sixth instant of the cycle;

setting the fourth switch to ON, at a seventh instant of the cycle;

setting the second switch to OFF, at an eighth instant of the cycle;

the cycle further comprising the following steps:

setting the sixth switch to ON at a first injection instant between the third instant and the fourth instant such that an injection voltage is applied between the poles of the injection inductance for an injection duration, until the fourth instant of the cycle, and that at the fourth instant of the cycle an injection current flows in the injection inductance, said injection current being greater than a predetermined minimum current;

setting the sixth switch to OFF at the fourth instant;

setting the fifth switch to ON at a second injection instant between the seventh instant and the eighth instant such that an injection voltage is applied between the poles of the injection inductance for the injection duration, until the eighth instant of the cycle, and such that at the eighth instant of the cycle an injection current flows in the injection inductance, said injection current being greater than a predetermined minimum injection current;

setting the fifth switch to OFF at the eighth instant;

repeating the steps of the cycle from a ninth instant.

According to one implementation mode, the invention comprises one or several of the following features, considered alone or in a technically acceptable combination.

According to one implementation mode, the first instant is determined as a function of a moment when the diode associated with the first switch is in conduction, such that a voltage across the terminals of the first switch is zero.

According to these arrangements, the capacitor arranged in parallel between the respective terminals of each of the first, second, third and fourth switches allows soft switching when the switches are turned OFF and when the switches of the first bridge arm are turned ON.

These systematic soft switching operations make it possible to reduce the stiffness of the voltage edges, which has two advantageous consequences: the reduction of the electromagnetic disturbances emitted by the converter, and the reduction or even the elimination of potentially destructive over-voltages at the terminals of the power transistors.

The injection inductance allows soft switching of the switches over the entire operating range, in particular by extending the operating range to the lowest operating powers.

According to one implementation mode, the injection duration $t_{cmd\_inj}$ is determined by the relationship:

$$t_{cmd\_inj} = t_4 - t_{3inj} = t_8 - t_{8inj} \quad [\text{Math 1}]$$

wherein $t_4$, is the fourth instant, $t_{3inj}$ is the first injection instant, $t_8$ is the ninth instant, and $t_{8inj}$ is the second injection instant.

According to one implementation mode, the injection duration is determined as a function of the predetermined minimum injection current.

According to one implementation mode, the injection duration is determined by the relationship:

$$t_{cmd\_inj} = I_{L_{inj}} \cdot \frac{L_{inj}}{V_{in}} \quad [\text{Math 2}]$$

wherein $I_{Linj}$ represents the predetermined minimum injection current, and $L_{inj}$ represents a value of the inductance of the injection inductance, and $V_{in}$ represents a value of the input voltage of the converter.

According to one implementation mode, the predetermined minimum injection current is determined as a function of an available current level $I_{Lk.dispo}$ in the primary coil of the primary circuit and a critical current level $I_{Lk.min}$ in the primary coil of the primary circuit.

According to one implementation mode, the predetermined minimum injection current is equal to $I_{Lk.min} - I_{Lk.dispo}$.

According to one implementation mode, the available current level $I_{Lk.dispo}$ depends on a ratio between a number of turns Np of the primary coil and a number of turns Ns of the secondary coil and of an average value of a current $I_{L1,moy}$ in an inductance L1, L2 of the secondary circuit.

According to one implementation mode, the level of current available $I_{Lk.dispo}$ is determined by the relationship:

$$I_{L_K,dispo} = \frac{N_P}{N_S} \cdot I_{L1,moy} \quad [\text{Math 3}]$$

According to one implementation mode, the critical current level $I_{Lk.min}$ in the primary coil of the primary circuit depends on a capacitance Cres of the capacitor disposed in parallel between the respective terminals of each of the first, second, third, and fourth switches and the leakage inductance L, the primary coil of the primary circuit and the input voltage Vin between the input terminals of the primary circuit of the converter.

According to one implementation mode, the critical current level $I_{Lk.min}$ in the primary coil of the primary circuit is determined by the relation:

$$I_{L_K,\min} = V_{in} \cdot \sqrt{\frac{2 \cdot C_{res}}{L_k}} \cdot K_{marge} \quad [\text{Math 3}]$$

wherein $K_{marge}$ is a margin coefficient to be adjusted so that the freewheel diode of any of the switches of the first bridge arm conducts enough time so that the gate voltage of the transistor of said switch is applied to guarantee a soft switching when the second switch B is turned ON, between an instant $t_5$, defined according to the fourth instant $t_4$, and the fifth instant $t_6$, and to guarantee a soft switching when the first switch A is turned ON between an instant $t_{10}$, defined as a function of the eighth instant $t_9$ and the first instant $t_0$;

According to one implementation mode, the coefficient $K_{marge}$ is equal to 1.2.

According to one implementation mode:

the second instant of the cycle is offset from the first instant by a first time offset, depending on a phase shifting between the first and second bridge arms, and a duration of a complete cycle;

the third instant of the cycle is offset from the first instant by a second time offset depending on the first time offset and a first dead time, the fourth instant of the cycle is offset from the first instant by a third time offset depending on the duration of a half-cycle and a second dead time;

the fifth instant of the cycle is offset from the first instant by a fourth time offset depending on the duration of a complete half-cycle;

the sixth instant of the cycle is offset from the first instant by a fifth time offset depending on the phase shifting and the duration of a complete half-cycle;

the seventh instant of the cycle is offset from the first instant by a sixth time offset depending on the phase shifting and the duration of a complete half-cycle and the first dead time;

the eighth instant of the cycle is offset from the first instant by a seventh time offset depending on the duration of a complete cycle and the second dead time.

According to one implementation mode, the phase shifting Ph between the first and second bridge arms is determined as a function of the ratio between the number of turns Np of the primary coil and the number of turns Ns of the secondary coil and of the ratio between the output voltage $V_{out}$ between the output terminals of the secondary circuit and the input voltage $V_{in}$, between the input terminals of the primary circuit.

According to one implementation mode, the phase shifting is defined by the relationship:

$$Ph = \frac{V_{out}}{V_{in}} \cdot \frac{N_p}{N_s} \quad [\text{Math 4}]$$

According to one implementation mode, the duration T of a complete cycle is a predetermined constant.

According to one implementation mode, said first dead time corresponding to both a time interval comprised between the second instant $t_2$ and a moment when the diode of the switch C becomes conductive, and to a time interval comprised between the sixth instant $t_7$ and a moment when the diode of the switch D becomes conductive.

According to one implementation mode, the first dead time $t_{mort\_C\_D}$ is adjusted to guarantee a soft switching of the switches of the second bridge arm, from the moment when the injection current has reached the predetermined minimum injection current.

According to one implementation mode, said second dead time corresponds to the time interval comprised between the instants $t_4$ and $t_5$, and also to the time interval comprised between $t_9$ and $t_{10}$.

According to one implementation mode, the second dead time $t_{mort\_A\_B}$ is determined as a function of the capacitance $C_{res}$ of the capacitor disposed in parallel between the respective terminals of each of the first, second, third, and fourth switches and of the leakage inductance $L_K$ of the primary coil of the primary circuit.

According to one implementation mode, the second dead time $t_{mort\_A\_B}$ is determined by the relationship:

$$t_{mort\_A\_B} = \frac{\pi}{2} \cdot \sqrt{L_k \cdot 2 \cdot C_{res}} \qquad [\text{Math 5}]$$

According to one mode of implementation, the first dead time $t_{mort\_A\_B}$ is determined by the relationship:

$$T_{mort\_C\_D} = [C_{res} \cdot V_{in}]/(I_{Ltcom}) \cdot (N_s/N_p) \qquad [\text{Math 6}]$$

Wherein the current $I_{Ltcom}$ is determined by the relation $$I_{Ltcom} = (I_{L1} + I_{L2})/2 \qquad [\text{Math 7}]$$

wherein $I_{L1}$ is the current in induction L1 at the instant $t_2$ and $I_{L2}$ is the current in the induction L2 at the instant $t_7$ According to one implementation mode, the first time offset between $t_0$ and $t_2$ is determined by the relationship:

$$t_2 = Ph \cdot T \qquad [\text{Math 8}]$$

According to one implementation mode, the second time offset between $t_0$ and $t_3$ is determined by the relationship:

$$t_3 \geq Ph \cdot T + t_{mort\_C\_D} \qquad [\text{Math 9}]$$

According to one implementation mode, the third time offset between $t_0$ and $t_4$ is determined by the relationship:

$$t_4 \leq \frac{T}{2} - t_{mort\_A\_B} \qquad [\text{Math 10}]$$

According to one implementation mode, the fourth time offset between $t_0$ and $t_6$ is determined by the relationship:

$$t_6 \leq \frac{T}{2} \qquad [\text{Math 11}]$$

According to one implementation mode, the fifth time offset between $t_0$ and $t_7$ is determined by the relationship:

$$t_7 = \frac{T}{2} + Ph \cdot T \qquad [\text{Math 12}]$$

According to one implementation mode, the sixth time offset between $t_0$ and $t_8$ is determined by the relationship:

$$t_8 \geq \frac{T}{2} + Ph \cdot T + t_{mort\_C\_D} \qquad [\text{Math 13}]$$

According to one implementation mode, the seventh time offset between $t_0$ and $t_9$ is determined by the relationship:

$$t_9 \leq T - t_{mort\_A\_B} \qquad [\text{Math 14}]$$

The invention also concerns a converter comprising a primary circuit and a secondary circuit, the converter being configured to convert an input voltage between two input terminals of the primary circuit into an output voltage between the output terminals of the secondary circuit, the primary circuit comprising:

a first bridge arm consisting of a first switch and a second switch, the first and second switches being connected in series between the input terminals of the primary circuit, a first center point of the first bridge arm designating an intermediate connection point between the first switch and the second switch;

a second bridge arm consisting of a third switch and a fourth switch, the third and fourth switches being connected in series between the input terminals of the primary circuit, a second center point of the second bridge arm designating an intermediate connection point between the third switch and the fourth switch, the second bridge arm being connected in parallel with the first bridge arm between the input terminals of the primary circuit;

a primary coil of the primary circuit, the primary coil comprising a leakage inductance, the primary coil being coupled by mutual induction to a secondary coil of the secondary circuit, the primary coil being connected by one pole to the center point of the first bridge arm, and by another pole to the center point of the second bridge arm;

the primary circuit further comprising:

a capacitor disposed in parallel between the respective terminals of each of the first, second, third and fourth switches;

a third bridge arm consisting of a fifth switch and a sixth switch, the fifth and the sixth switch being connected in series between the input terminals of the primary circuit, a third center point of the third bridge arm designating an intermediate connection point between the fifth switch and the sixth switch, the third bridge arm being connected in parallel with the first and second bridge arms between the input terminals of the primary circuit;

each of the first, second, third, fourth, fifth and sixth switches being associated with a diode connected to the terminals of said first, second, third, fourth, fifth and sixth switches;

an injection inductance connected by one pole to the center point of the first bridge arm, and by another pole to the center point of the third bridge arm;

a monitoring-control unit configured to control a state of the switches, each switch being configured to be alternately turned ON or OFF, the monitoring-control unit being configured to implement a switch control cycle comprising the steps of a method according to any of the implementation modes described hereinabove.

According to one embodiment, the invention comprises one or several of the following features, considered alone or in a technically acceptable combination.

According to one embodiment, the secondary circuit comprises:

a fourth bridge arm consisting of a seventh switch and an eighth switch, the seventh and eighth switches being connected in series between the terminals of the secondary coil of the secondary circuit, a fourth center point of the fourth bridge arm designating an intermediate connection point between the seventh switch and the eighth switch;

a fifth bridge arm consisting of a first inductance and a second inductance, the first and second inductances being connected in series between the terminals of the secondary coil of the secondary circuit, a fifth center point of the fifth bridge arm designating an intermediate connection point between the first inductance and the second inductance, the fifth bridge arm being connected in parallel with the fourth bridge arm between the terminals of the secondary coil; the fourth center point being attached to an output terminal of the secondary circuit, and the fifth center point being attached to the other output terminal of the secondary circuit.

According to one embodiment, the secondary circuit further comprises a capacitor disposed between the output terminals of the secondary circuit.

BRIEF DESCRIPTION OF THE DRAWINGS

For better understanding thereof, one embodiment and/or implementation of the invention is described with reference to the appended drawings representing, as a non-limiting example, an embodiment or implementation respectively of a device and/or a method according to the invention. Elements bearing the same references in the drawings refer to similar elements or to elements whose functions are similar.

FIG. 3.1 is a schematic representation of a part of the electrical circuit of FIG. 1, which is active during a portion of the operating cycle of the circuit, said portion of the cycle being comprised between the times $t_3$ and $t_{3inj}$ of the time axis of the timing diagram of FIG. 2.

FIG. 3.2 is a schematic representation of a part of the electrical circuit of FIG. 1, which is active during a portion of the operating cycle of the circuit, said portion of the cycle being comprised between times $t_{3inj}$ and $t_4$ of the time axis of the timing diagram of FIG. 2.

FIG. 3.3 is a schematic representation of a part of the electrical circuit of FIG. 2, which is active during a portion of the operating cycle of the circuit, said portion of the cycle being comprised between times $t_4$ and $t_5$ of the time axis of the timing diagram of FIG. 2.

FIG. 3.4 is a schematic representation of a part of the electrical circuit of FIG. 1, which is active during a portion of the operating cycle of the circuit, said portion of the cycle being comprised between the times $t_8$ and $t_{8inj}$ of the time axis of the timing diagram of FIG. 2.

FIG. 3.5 is a schematic representation of a part of the electrical circuit of FIG. 1, which is active during a portion of the operating cycle of the circuit, said portion of the cycle being comprised between the times $t_{8inj}$ and $t_9$ of the time axis of the timing diagram in FIG. 2.

FIG. 3.6 is a schematic representation of a part of the electrical circuit of FIG. 2, which is active during a portion of the operating cycle of the circuit, said portion of the cycle being comprised between times $t_9$ and $t_{10}$ of the time axis of the timing diagram in FIG. 2.

FIG. 5 is a schematic representation of a second embodiment of the secondary circuit according to the invention.

FIG. 6 presents a third embodiment of the secondary circuit according to the invention, with in FIG. 6*a*, a first schematic representation of said third embodiment, and in FIG. 6*b*, a second equivalent schematic representation of said third embodiment.

DETAILED DESCRIPTION

Figure 1:
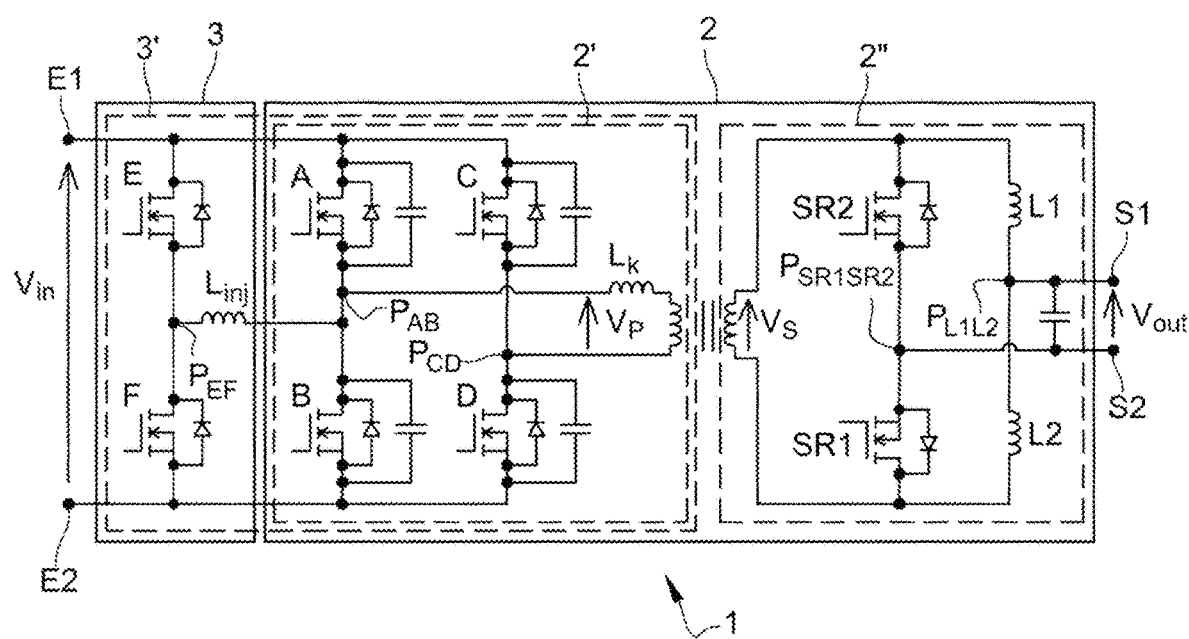
FIG. 1 is a schematic representation of an electrical circuit according to an embodiment of the invention.

FIG. 1 is an equivalent electrical diagram of a converter 1 according to an embodiment of the invention. The diagram in FIG. 1 has two parts 2, 3.

The first part 2 comprises a primary circuit first portion 2' and a secondary circuit 2".

The primary circuit first portion 2' comprises two input terminals E1, E2 configured to receive an input voltage $V_{in}$. It also comprises a first pair of switches A, B connected in series, in other words in a bridge arm between the two input terminals E1, E2, as well as a second pair of switches C, D connected in series, in other words in a bridge arm between the two input terminals E1, E2. The first pair of switches A, B, and the second pair of switches C, D thus form two bridge arms, both connected in parallel between the two input terminals E1, E2.

Each bridge arm comprises a center point $P_{AB}$, $P_{CD}$ at a termination point located between the two switches of said bridge arm.

The center points $P_{AB}$, $P_{CD}$ of each bridge arm are connected by a primary coil coupled to a secondary coil of the secondary circuit 2". Said primary coil is characterized by a leakage inductance $L_k$; it receives between its terminals, that are attached to the center points $P_{AB}$, $P_{CD}$, a primary voltage $V_p$, determined in particular by the open or closed state of the switches A, B, C and D.

At the terminals of each of the switches A, B, C, D, a parallel capacitor is disposed so as to connect the respective terminals of each of the said switches A, B, C, D. The capacitance of the said parallel capacitor is greater than the intrinsic capacitance, related to the composition of the transistors, of each switch A, B, C, D.

The second part 3 of the diagram describes the second portion 3 of the primary circuit, complementary to the first portion 2' of the primary circuit, such that, according to the embodiment of the invention described herein, the primary circuit comprises the second portion 3 which will now be described, coupled to the first portion 2' described hereinbefore.

Said second portion 3 of the primary circuit comprises a pair of injection switches E, F in series, in other words in a bridge arm, between the two input terminals E1, E2. The pair of injection switches E, F thus form a third bridge arm, connected in parallel between the two input terminals E1, E2. Said third bridge arm comprises a center point $P_EF$ at a termination point located between the two injection switches E, F of said third bridge arm. This center point $P_{EF}$ and the center point $P_{AB}$ of any of the two bridge arms previously described, are electrically connected by an injection circuit characterized by its injection inductance $L_{inj}$.

Moreover, a diode inherent in the construction of the switch, is present in parallel with the switches A, B, C, D, E, F, in which the cathode of the diode is electrically connected to the drain, or to the collector of the switch and the anode of the diode is electrically connected to the source, or to the emitter of the switch. This diode is intrinsic to metal-oxide gate field-effect transistors, otherwise known as MOSFET; a diode is added in the case of using insulated gate bipolar transistors, otherwise called IGBT.

To guarantee maximum efficiency, according to the invention, the recombination charges of the diode must be negligible compared with the charges corresponding to the capacitances of said parallel capacitor.

The Silicon carbide (SiC) or gallium nitrite (GaN) diodes are suitable for this invention, according to those skilled in the art.

More generally, a MOSFET SiC transistor, or a high-mobility electron GaN transistor, otherwise called HEMT, or a fast IGBT transistor with a SiC diode in parallel, according to the previous description, characterized by a high speed recombination of minority carriers, are suitable for switches A, B, C, D, E, F.

The diode in parallel with the switches conducts spontaneously, that is to say when the electric potential of its anode becomes higher (typically by +0.5 Volt), than its cathode. The control of the switches A, B, C, D, E, F is used to short-circuit this diode.

Thus, those skilled in the art should understand that each switch A, B, C, D, E, F comprises, according to an equivalent electrical diagram of said switch, a "perfect" switch A, B, C, D, E, F and an intrinsic or added diode. In the following text, the term switch refers to the perfect switch, forming said switch with the intrinsic or added diode, according to the embodiments. In particular, those skilled in the art should understand that turning ON a switch corresponds to turning ON the corresponding perfect switch, said turning ON of the perfect switch possibly occurring when the corresponding diode is already conductive, such that the switch, consisting of the perfect switch and the corresponding diode, is already partly closed.

The assembly, consisting of the primary circuit first portion 2' that is coupled as indicated hereinabove to the primary circuit second portion 3, constitutes the primary circuit 3' of the converter 1.

Said primary circuit constituted in this manner receives between these input terminals E1, E2 an input voltage $V_{in}$, transformed into a primary voltage $V_p$, determined in particular by the state of the switches A, B, C and D, at the terminals of the primary coil. Said primary coil is magnetically coupled to a secondary coil of the secondary circuit 2" which will now be described.

Figure 7:
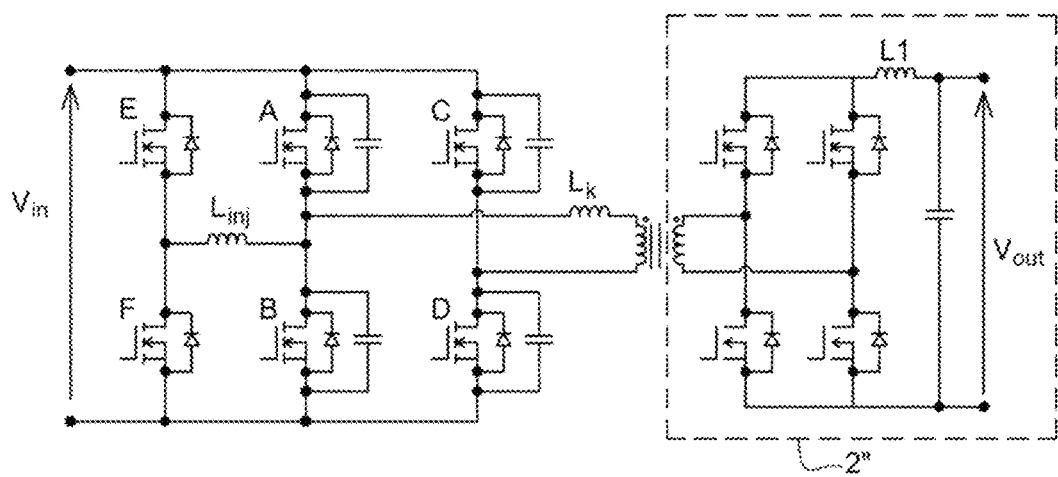
FIG. 7 is a schematic representation of a fourth embodiment of the secondary circuit according to the invention.

The terminals of said secondary coil are connected in parallel, on the one hand by a fourth bridge arm consisting of a fourth pair of switches SR1, SR2, with common sources or with a common anode in the case of using only two diodes, disposed in series between the terminals of the secondary coil, on the other hand by a fifth bridge arm, consisting of a pair of inductance L1, L2 disposed in series between the terminals of the secondary coil. A center point $P_{L1L2}$ of the fifth bridge arm, located at the termination point between the two inductances L1, L2, and a center point $P_{SR1SR2}$ of the fourth bridge arm, located at the termination point between the two switches SR1, SR2, are directly and respectively electrically connected to the output terminals S1, S2 of the converter 1. A capacitor is placed between said output terminals S1, S2. The function of the secondary circuit 2", may be carried out according to at least another embodiment, as illustrated in FIGS. 5, 6 and 7, as follows:

two secondary windings of the transformer connected in series and coupled with the primary winding, of two diodes and two MOSFET transistors and an inductance L1, according to the equivalent circuit 2" represented in FIG. 5;

a secondary winding of the transformer coupled with the primary winding of two diodes and two MOSFET transistors, according to any of the equivalent circuits 2" represented in FIG. 6a or in FIG. 6b;

a secondary winding of the transformer coupled with the primary winding, four diodes and four MOSFETS and an inductance, according to the equivalent circuit 2" represented in FIG. 7.

Figure 2:
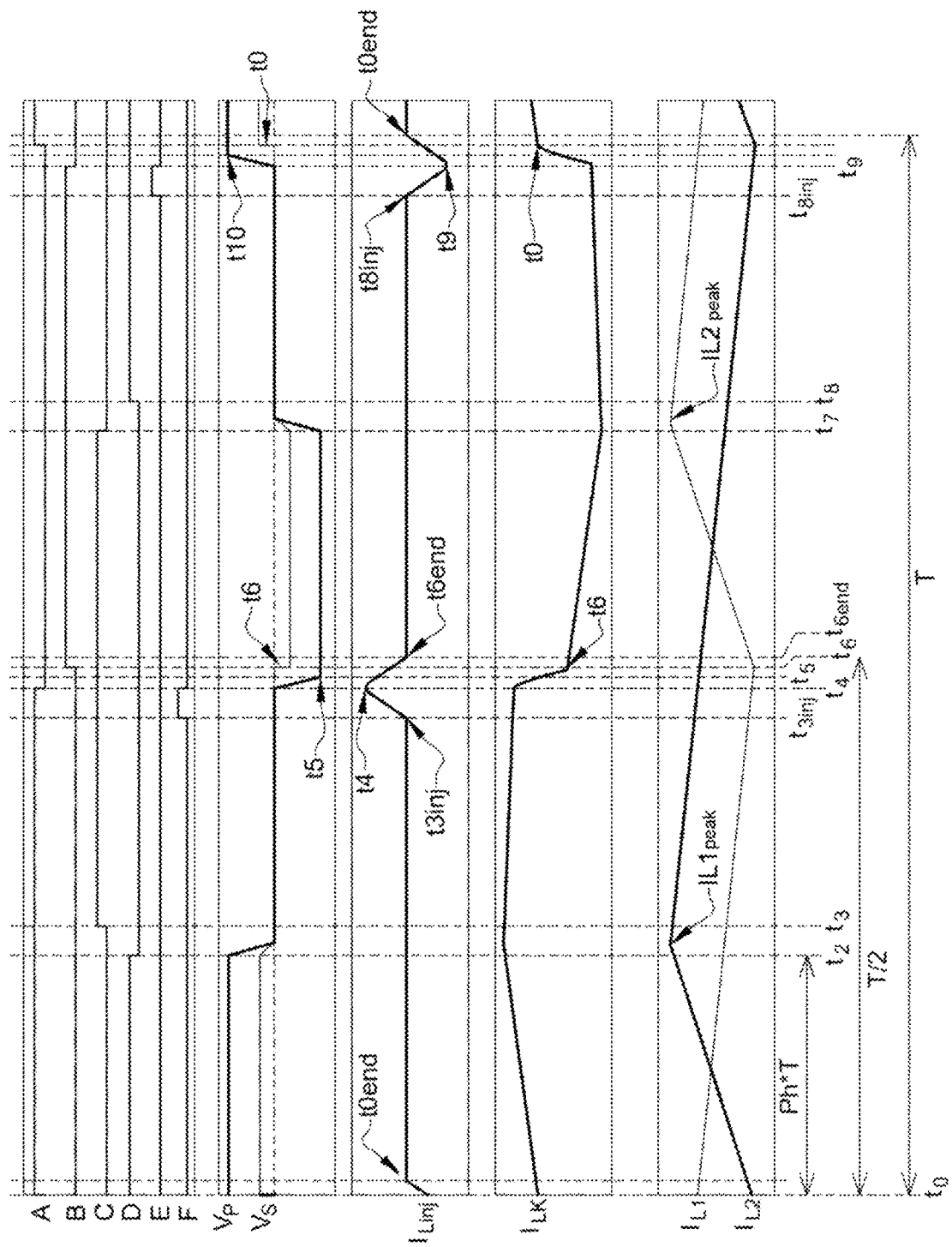
FIG. 2 is a timing diagram representing the evolution of the state of the components of the circuit represented in FIG. 1, and the evolution of the currents and voltages between different points of the circuit.

These different electrical configurations regarding the realization of the secondary circuit 2" do not change the operating sequences of the primary power circuit 2' and 3' according to the time sequencing of FIG. 2.

The switches A, B, C, D, E, F are configured to be monitored by a monitoring unit not represented in FIG. 1. According to one embodiment, each switch A, B, C, D, E, F is configured to receive a signal from the monitoring unit; depending on the received signal, the switch is either conductive, i.e. allows current to flow, in other words is closed, or the switch is blocking, i.e. does not allow current to flow, in other words is open. In the following description, for simplicity, when the switch is conductive, it will be described as being set to ON, and when the switch is blocking, it will be described as being set to OFF.

The converter 1 is configured to transform an input voltage V between the input terminals E1, E2 of the primary circuit 3', into an output voltage $V_{out}$ between the output terminals S1, S2 of the secondary circuit, according to a method which will now be described, with reference to the timing diagram of FIG. 2, which represents the evolution as a function of time of the state of the switches A, B, C, D, E, F of the primary circuit of the converter 1, and the evolution as a function of time of the currents and voltages between the terminals of the various components of the primary and secondary circuits.

The considered switches, currents and voltages are represented along the vertical axis of the timing diagram in FIG. 2, and the different instants $t_0$, $t_{0end}$, $t_1$, $t_2$, $t_3$, $t_{3inj}$, $t_4$, $t_5$, $t_6$, $t_{6end}$, $t_7$, $t_8$, $t_{8inj}$, $t_9$, $t_{10}$, of an operating cycle of the converter 1 are represented on the horizontal axis.

Figure 4:
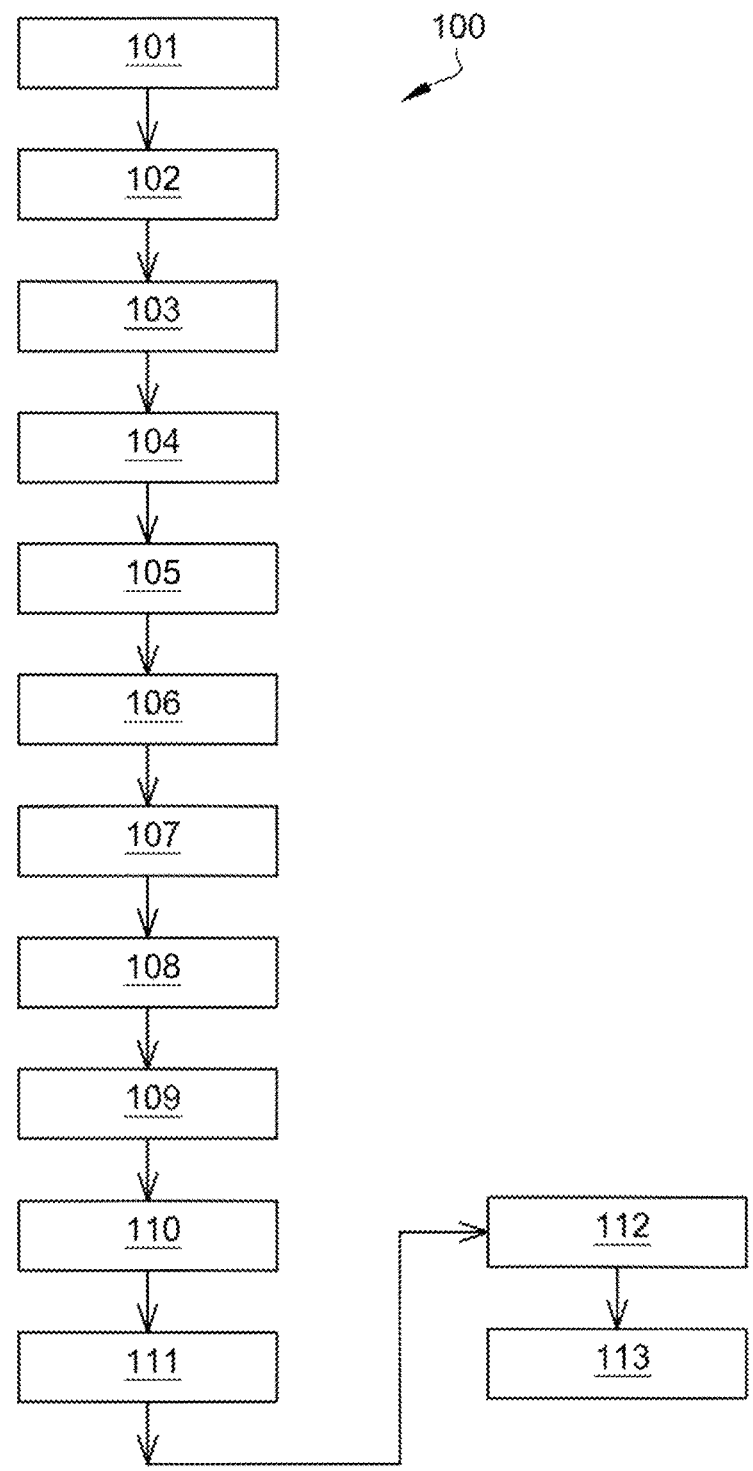
FIG. 4 is a schematic representation of the steps of the method according to the invention.

According to one embodiment of the method, the monitoring unit is configured so that, during an operating cycle of the converter 1, the monitoring unit of the converter 1 successively controls the performance of the following steps 101 to 113 of the method 100, schematically shown in FIG. 4:

101: setting the first switch A to ON, at a first instant to;
102: setting the fourth switch D to OFF, at a second instant $t_2$ of the cycle;
103: setting the third switch C to ON, at a third instant $t_3$ of the cycle;
104: setting the first switch A to OFF, at a fourth instant $t_4$ of the cycle;

105: setting the second switch B to ON, at the fifth instant $t_6$, of the cycle;

106: setting the third switch C to OFF, at a sixth instant $t_7$ of the cycle;

107: setting the fourth switch D to ON, at a seventh instant $t_8$ of the cycle;

108: setting the second switch B to OFF, at an eighth instant $t_9$ of the cycle;

109: setting the sixth switch F to ON at a first injection instant $t_{3inj}$; comprised between the third instant $t_3$; and the fourth instant $t_4$, such that an injection voltage is applied between the poles of the injection inductance $L_{inj}$ for a duration $t_{cmd\_inj}$, until the fourth instant $t_4$ of the cycle, and that at the fourth instant 14, of the cycle an injection current $I_{Linj}$ flows in the injection inductance $L_{inj}$, said injection current $I_{Linj}$; being greater than a predetermined minimum current;

110: setting the sixth switch F to OFF at the fourth instant $t_4$;

111: setting the fifth switch E to ON at a second injection instant $t_{8inj}$ comprised between the seventh instant $t_8$ and the eighth instant $t_9$ such that an injection voltage is applied between the poles of the injection inductance $L_{inj}$, for the duration $t_{cmd\_inj}$, until the eighth instant $t_9$ of the cycle, and such that at the eighth instant $t_9$ of the cycle an injection current $I_{Linj}$ flows in the injection inductance $L_{inj}$, said injection current $I_{Linj}$ being greater than a predetermined minimum injection current;

112: setting the fifth switch E to OFF at the eighth instant $t_9$;

113: repeating steps 101 to 112 of the cycle from a ninth instant $t_{10}$.

Thus, the instant to is both the end of a previous cycle and the start of the next cycle of operation of the converter 1. The order of presentation of steps 101 to 113 of the steps does not correspond to the order in which said steps come in succession over time. The temporal succession order of the steps is determined by the instants which define each step and according to the chronology illustrated in FIG. 2.

In order to define the instants $t_0$, $t_2$, $t_3$, $t_4$, $t_6$, $t_7$, $t_8$, a phase shifting Ph between the bridge arms A,B and C,D, and a first dead time $t_{mort\_A\_B}$, are used said first dead time corresponding to the time interval comprised between the instants $t_4$ and $t_5$, and also to the time interval comprised between $t_9$ and $t_{10}$, said phase shifting and said first dead time being calculated by the relations hereinbelow; a cutting period T, or duration T of a complete cycle, is also used, said duration T being a predetermined constant, and a second dead time $t_{mort\_C\_D}$, said second dead time corresponding to both a time interval comprised between $t_2$ and a moment when the diode of the switch C becomes conductive, and at a time interval comprised between $t_7$ and a moment when the diode of the switch D becomes conductive, the second dead time being adjusted to ensure soft switching operations of the bridge arm C,D, from the moment when the injected current $I_{inj}$, flowing in $L_k$, during this phase, is sufficient to ensure a soft switching.

The phase shifting between the bridge arms A, B and C, D is defined by the relationship:

$$Ph = \frac{V_{out}}{V_{in}} \cdot \frac{N_p}{N_s} \qquad \text{[Math 15]}$$

and the first dead time, by the relation:

$$t_{mort\_A\_B} = \frac{\pi}{2} \cdot \sqrt{L_k \cdot 2 \cdot C_{res}} \qquad \text{[Math 16]}$$

and the second dead time, by the relation:

$$T_{mort\_C\_D} = [C_{res} \cdot V_{in}]/(I_{Ltcom}) \cdot (N_s/N_p) \qquad \text{[Math 17]}$$

with the current $I_{Ltcom}$ being defined by:

$$I_{Ltcom} = (I_{L1} + I_{L2})/2 \qquad \text{[Math 18]}$$

where $I_{L1}$ is the current in the induction L1 at the instant $t_2$ and $I_{L2}$ is the current in the induction L2 at the instant $t_7$ The control instants by the relations hereinbelow are then determined:

$$t_0 = 0 \qquad \text{[Math 19]}$$

$$t_2 = Ph \cdot T \qquad \text{[Math 20]}$$

$$t_3 \geq Ph \cdot T + t_{mort\_C\_D} \qquad \text{[Math 21]}$$

$$t_4 \leq \frac{T}{2} - t_{mort\_A\_B} \qquad \text{[Math 22]}$$

$$t_6 \leq \frac{T}{2} \qquad \text{[Math 23]}$$

$$t_7 = \frac{T}{2} + Ph \cdot T \qquad \text{[Math 24]}$$

$$t_8 \geq \frac{T}{2} + Ph \cdot T + t_{mort\_C\_D} \qquad \text{[Math 25]}$$

$$t_9 \leq T - t_{mort\_A\_B} \qquad \text{[Math 26]}$$

The injection switches are E and F.

The instants of switching to ON of the injection switches E, F are respectively the second and first injection instants $t_{8inj}$, $t_{3inj}$; the duration for which these injection switches E, F are set to ON must allow the pre-charging of the injection inductance $L_{inj}$ at the desired injection current level.

The injection current level $I_{Linj}$ must make it possible to compensate for the lack of inductive energy available with the leakage inductance $L_k$.

The level of the critical current $I_{LK}$, in the leakage inductance $L_k$ is that defined for the injection activation criterion, multiplied by a margin coefficient to be adjusted if necessary to guarantee the soft switching. The margin coefficient Kmarge is sized so that diode B, in parallel with the transistor B, becomes conductive during the time interval comprised between times t5 and t6, thus guaranteeing the soft switching. Thus the gate voltage of the transistor B may be suitably applied at $t_6$, that is to say that the transistor B closes while the voltage between the drain and the source is negative corresponding to the conduction threshold voltage of the diode B, in parallel with the transistor B. Typically the voltage before the closing of the transistor is −0.5 Volt, i.e. very close to 0. It is the soft switching when a transistor B is set to ON.

Advantageously, Kmarge=1.2 should be selected.

The level of the critical current $I_{LK}$ in the leakage inductance $L_K$ is defined so as to cancel the voltage across the terminals of the switch B (respectively A), therefore at the terminals of the parallel capacitor disposed between the terminals of switch B (respectively A), between $t_5$ and $t_6$ where the switch B may be set to ON favorably (respectively at the cycle start, between the end of a previous cycle and the start of the following cycle where the switch A may be set to ON favorably).

Cancellation is naturally reached when the inductive energy of the circuit is sufficient to fully transfer the capacitive energy, i.e. cancel the voltage across the terminals of switch B (respectively A) and establish the voltage across the terminals of the switch A (respectively B).

This inductive energy decreases with the decrease of the output current and therefore of the transferred power level, while the capacitive energy depends only on the input voltage, which is independent of the transferred power.

When the inductive energy becomes lower than the capacitive energy, the voltage cancellation allowing the soft switching of the transistors no longer occurs. The injection inductance Linj, previously pre-charged at a certain level of injection current $I_{Linj}$ during the so-called freewheeling phase, which precedes the fourth instant $t_4$ (respectively, the eighth instant $t_9$).

Once the injection inductance $L_{inj}$ has been pre-charged, the inductive energy stored in the injection inductance Lin; is added to the inductive energy of the leakage inductance $L_K$ on opening, i.e. on setting to OFF, of the switch A (respectively of switch B) to discharge the parallel capacitor of the switch B (respectively the parallel capacitor of switch A) and charge the parallel capacitor of the switch A (respectively the parallel capacitor of the switch B).

The activation condition of the injection current results from the comparison between an inductive energy and a capacitive energy, defined hereinbelow.

The parallel capacitors implanted in parallel with the switches A, B, C and D each have a capacitance $C_{res}$ of a value much greater than the parasitic capacitances of the components. The capacitive energies of the components may therefore be neglected. The capacitive energy to be considered is thus defined by the formula:

$$C_{res} \cdot V_{in}^2 \qquad \text{[Math 27]}$$

Similarly, the value of the inductance of the leakage inductance Lk of the converter 1, deliberately high to reduce the overvoltages related to the recovery currents of the rectifying diodes SR1, SR2 of the secondary stage, makes the contribution of the energy of the magnetizing inductance of the converter 1 to the inductive energy of the circuit.

The current in the leakage inductance $L_k$ of the converter 1, at the instant $t_4$ (respectively $t_9$) is comprised between the image of the maximum current and the image of the average current in L1 (respectively L2, L1 and L2 being identical). It should be considered the image of the average current, which is the lower bound.

The inductive energy to be considered is defined by the formula:

$$\frac{1}{2} \cdot L_k \cdot \left( I_{L_1,moy} \cdot \frac{N_s}{N_p} \right)^2 \qquad \text{[Math 28]}$$

Note that the voltage Vs at the terminals of the secondary coil of the secondary circuit is zero during this phase because the secondary coil is short-circuited by the 2 conductive transistors SR1 and SR2 (between the instants $t_3$ and $t_4$, as well as between the instants $t_8$ and $t_9$).

Only the energy of the leakage inductance $L_k$, charged with a current corresponding to the image of the secondary current, is returned to the primary coil according to the ratio Ns/Np between the number of turns Ns of the secondary coil and the number of turns Np of the primary coil.

The injection of the injection current $I_{Linj}$ is necessary when the inductive energy is less than the capacitive energy defined by the formula:

$$\frac{1}{2} \cdot L_k \cdot \left( I_{L_1,moy} \cdot \frac{N_s}{N_p} \right)^2 < C_{res} \cdot V_{in}^2 \qquad \text{[Math 29]}$$

In this relation, $L_k$, Ns, Np and Cres are fixed and known quantities of the circuit, Vin is measured and does not depend on the output power. Only $I_{L1}$, measured by the monitoring-control unit of the converter 1, depends on the output power.

The relationships hereinbelow therefore make it possible to establish the activation criterion on the measurement of the current $I_{L1}$:

$$I_{L_1,moy} < \frac{N_p}{N_s} \cdot V_{in} \cdot \sqrt{\frac{2 \cdot C_{res}}{L_k}} \qquad \text{[Math 30]}$$

$$I_{L_K,min} = V_{in} \cdot \sqrt{\frac{2 \cdot C_{res}}{L_k}} \cdot K_{marge} \qquad \text{[Math 31]}$$

The value of the available current $I_{Lk.dispo}$ with the leakage inductance Lk during the soft switching phase is the image of the average value $I_{L1,moy}$ of the current in the inductance L1 (identical to that in L2); it is defined by the relation:

$$I_{L_K,dispo} = \frac{N_P}{N_S} \cdot I_{L_1,moy} \qquad \text{[Math 32]}$$

The required injection current $I_{Linj}$ is therefore defined by the relation:

$$I_{Linj} = I_{L_K,min} - I_{K.dispo} \qquad \text{[Math 33]}$$

While the injection switches E, F are set to ON, the voltage applied to the terminals of the injection inductance is constant, and equal to ±Vin.

With knowledge of the desired injection current level $I_{Linj}$, it is possible to calculate the injection duration $t_{cmd\_inj}$ during which the injection switches E, F are set to ON, by the relationship:

$$t_{cmd\_inj} = I_{L_{inj}} \cdot \frac{L_{inj}}{V_{in}} \qquad \text{[Math 34]}$$

It is therefore possible to define the first and second injection instants of the injection switches by the relationships below:

$$t_{3inj} = t_4 - t_{cmd\_inj} \qquad \text{[Math 35]}$$

$$t_{8inj} = t_9 - t_{cmd\_inj} \qquad \text{[Math 36]}$$

The phase prior to the activation of the injection of the injection current begins after the instant $t_3$ when the switch C is set to ON. FIG. 3.1 presents the diagram of the equivalent circuit with the components of the circuit which are crossed by a current during this preliminary phase. During this phase prior to the injection of the injection current, a current $I_{Lk}$ circulates in free-wheeling through the switches A and C, the voltage Vp is zero and the voltage Vs at the terminals of the secondary coil is zero, the current of inductance $L_1$ passes through the switch SR2 and the current of the inductance $L_2$ passes through the switch SR1.

The preparation of the injection of the current begins with the setting of the switch F to ON at a first injection instant $t_{3inj}$, as it is illustrated on the diagram of the corresponding equivalent circuit represented on FIG. 3.2, the aim being to pre-charge the injection inductance $L_{inj}$ with an injection current $I_{Linj}$; of the same sign as the current $I_{Lk}$ seen from the center point $P_{AB}$ of the bridge arm A, B, both of the currents being positive according to the adopted sign conventions.

To this end, advantage is taken of the freewheel state of the current passing through the switches A and C. The center point $P_{AB}$ of the bridge arm A, B being at potential $+V_{in}$ due to the conductive state of the switch A, by setting switch F to ON, the inductance $L_{inj}$ has the voltage $V_{in}$ at its terminals, which causes the current $I_{Linj}$ to increase linearly.

The calculation of the pre-charge time, defining the instant $t_{3inj}$ with respect to $t_4$ has been described hereinabove.

At the instant $t_4$, the switch A is opened, i.e. is set to OFF, and the injection switch F is also opened, i.e. is set to OFF, as illustrated by the diagram of the equivalent circuit presented in the first part of FIG. 3.3.*a*. The current $I_{Linj}$ that was flowing through F now loops back through the freewheeling diode of the switch E. All components of the bridge arm A, B are blocked. Thus, the current of the two inductances $L_{inj}$; and $L_K$, flows through the capacitors, charging the parallel capacitor of the switch A and discharging the parallel capacitor of the switch B.

When the voltage across the terminals of the parallel capacitor of the switch B, and hence at the terminals of the freewheeling diode of the switch B, is completely canceled at t5, the current flows through the freewheeling diode of the switch B, as illustrated by the diagram of the equivalent circuit represented in FIG. 3.3.*b*. The voltage across the terminals of the switch B is therefore maintained at zero (at the threshold voltage of the freewheeling diode close to −0.5 Volt), which allows a soft switching when the switch B is set to ON between t5 and t6. The coefficient Kmarge is adjusted so that the transistor of the switch B has time to close when the freewheeling diode of the switch B is conductive.

Since the current in the inductance L2 is low, the duty cycle loss time, i.e. the time during which the leakage inductance $L_k$ catches up with the current image in L2 before energy transfer, may be almost non-existent, and therefore t5 and t6 may seem to coincide, as represented in the timing diagram of FIG. 2.

For the injection inductance $L_{inj}$, the time period between the instant $t_5$ and an instant $t_{6end}$ constitutes a phase for returning to the rest state, said instant $t_{6end}$ being the moment when the current is canceled in the injection induction. Indeed, the freewheeling diode of the switch E and the switch B being both conductive, the voltage across the terminals of the injection inductance $L_{inj}$ is equal to $-V_{in}$, which causes its current to decrease linearly until its cancellation, leading to the blocking of the freewheeling diode of the switch E. The freewheeling diode of the switch E stops conducting with a low current slope (i.e characterizing the discontinuous mode) thus generating nearly zero joule losses in the components E and F.

Similarly to what has been previously described, with reference to FIGS. 3.1, 3.2, and 3.3 regarding the operation of the converter 1 to obtain a soft switching when setting the switch B to ON, the operation of the converter 1 to obtain a soft switching when setting the switch A to ON, will be described hereinbelow with reference to FIGS. 3.4, 3.5 and 3.6.

The phase prior to the activation of the injection of the injection current begins after the instant $t_8$ when the switch D is set to ON. FIG. 3.4 presents the diagram of the equivalent circuit with the components of the circuit which are crossed by a current during this preliminary phase. During this phase prior to the injection of the injection current, a current $I_{Lk}$ circulates in free-wheeling through the switches B and D, the voltage Vs at the terminals of the secondary coil is zero, the current of the inductance $L_1$ passes through the switch SR2 and the current of the inductance L2 passes through the switch SR1.

Preparation for current injection begins with setting the switch E to ON at a first injection instant $t_{8inj}$, as illustrated in the diagram of the corresponding equivalent circuit represented in FIG. 3.5, the aim being to pre-charge the injection inductance $L_{inj}$ with an injection current $I_{Linj}$ of the same sign as the current $I_{Lk}$ seen from the center point $P_{AB}$ of the bridge arm A, B, both of the currents being positive according to the adopted sign conventions.

To this end, advantage is taken of the freewheeling state of the current through the switches B and D. The center point $P_{AB}$ of the bridge arm A, B being at potential $+V_{in}$ due to the conductive state of the switch B, by setting the switch E to ON, the inductance $L_{inj}$ has the voltage $V_{in}$ at its terminals, which causes the current $I_{Linj}$ to increase linearly.

The calculation of the pre-charge time, defining the instant $t_{8inj}$; with respect to $t_9$ has been described hereinabove.

At the instant t9, the switch B is opened, i.e. is set to OFF, and the injection switch E is also opened, i.e. is set to OFF, as illustrated by the diagram of the equivalent circuit presented in the first part of FIG. 3.6.*a*. The current $I_{Linj}$ that was flowing through E now loops back through the freewheeling diode of the switch F. All components of the bridge arm A, B are blocked (opened). Thus, the current of the two inductances $L_{inj}$; and $L_K$, flows through the capacitors, charging the parallel capacitor of the switch B and discharging the parallel capacitor of the switch A.

When the voltage across the terminals of the parallel capacitor of the switch A, and hence at the terminals of the freewheeling diode of the switch A, is completely canceled, the current flows through the freewheeling diode of the switch A, as illustrated by the diagram of the equivalent circuit represented in FIG. 3.6.*b*. The voltage across the terminals of the switch A is therefore maintained at zero (near the threshold voltage of the freewheeling diode), which allows a soft switching when the switch A is set to ON between $t_{10}$ and $t_0$.

Since the current in the inductance L1 is low, the duty cycle loss time, i.e. the time during which the leakage inductance $L_k$ catches up with the current image in L1 before energy transfer, may be almost non-existent, and therefore to and $t_1$ may seem to coincide, as represented in the timing diagram of FIG. 2.

For the injection inductance $L_{inj}$, the time period between the instant $t_{10}$ and the instant $t_{0end}$ constitutes a phase for returning to the rest state, said instant $t_{0end}$ being the moment when the current is canceled in the injection induction. Indeed, the freewheeling diode of the switch F and the switch A being both conductive, the voltage across the terminals of the injection inductance $L_{inj}$ is equal to $V_{in}$, which causes its current to increase linearly until its cancellation, leading to the blocking of the freewheeling diode of the switch F.

According to these arrangements, the converter 1 implemented for example on a 10 KW, 700 Vin/110 VDCout battery charger, operates with a power range comprised between 100% and 0.4% of its nominal power. The arrangements described hereinabove thus make it possible to operate at very low load without causing thermal and electrical stresses on the power semiconductors A and B.

Between the instants t2 and t3, respectively between the instants t7 and t8, the soft switching of the switch C, respectively of the switch D, takes place without an injection circuit. Indeed, it is the image of the current of $I_{L1}$ or $I_{L2}$, returned back to the primary which ensures the charge of Cres at constant current even at low load. The amplitude of $I_{L1}$ or $I_{L2}$, then operating in discontinuous mode, generates peak currents at instant t2 ($I_{L1}$) and at instant t7 ($I_{L2}$) high enough to charge Cres.

The peak currents of IL1 and IL2 have been sized by the value of L1 and L2, so that the energies ½·L1·[IL1·(Ns/Np)]² and ½·L2·[IL2·(Ns/Np)]² respectively at t2 and t7 are much greater than Vin²·Cres.

Furthermore, the energy in the inductance $L_k$ defined by ½·$L_k$·[$I_{LK}$]² at t2 and at t7 is much lower than ½·L1·[IL1·(Ns/Np)]² at t2 and much lower than ½·L2·[IL2·(Ns/Np)]² at t7.

If the conditions described are not met, a fourth bridge arm may then be added with a second inductance Linj in $P_{CD}$, to ensure the soft switching of the switches C and D. This bridge arm will then consist of two switches G and H connected, as for 3' between E1 and E2; they are not represented in FIG. 1.

The soft switching operations when setting the switch C at t2 and the switch D at t7 to ON will then be respected.

The technique for injecting current may also be used in Dual Active Bridge (DAB) applications to ensure the soft switching of low-load power switches according to the same sequencing described in FIG. 2.

The invention claimed is:

1. A method for converting an input voltage between two input terminals of a primary circuit of a converter into an output voltage between two output terminals of a secondary circuit of the converter, the primary circuit comprising:
   a first bridge arm consisting of a first switch and a second switch, the first switch and the second switch being connected in series between the input terminals of the primary circuit, a first center point of the first bridge arm designating an intermediate connection point between the first switch and the second switch;
   a second bridge arm consisting of a third switch and a fourth switch, the third switch and the fourth switch being connected in series between the two input terminals of the primary circuit, a second center point of the second bridge arm designating an intermediate connection point between the third switch and the fourth switch, the second bridge arm being connected in parallel with the first bridge arm between the input terminals of the primary circuit;
   a primary coil of the primary circuit, the primary coil comprising a leakage inductance, the primary coil being coupled by mutual induction to a secondary coil of the secondary circuit, the primary coil being connected by a pole to the first center point of the first bridge arm, and by another pole to the second center point of the second bridge arm;
   the primary circuit further comprising:
      a capacitor disposed in parallel between respective terminals of each of the first, second, third and fourth switches;
      a third bridge arm consisting of a fifth switch and a sixth switch, the fifth switch and the sixth switch being connected in series between the input terminals of the primary circuit, a third center point of the third bridge arm designating an intermediate connection point between the fifth switch and the sixth switch,
      the third bridge arm being connected in parallel with the first and second bridge arms between the input terminals of the primary circuit;
      each of the first, second, third, fourth, fifth and sixth switches being associated with a diode connected to the respective terminals of each of the first, second, third, fourth switches, and respective terminals of each of the fifth and sixth switches;
      an injection inductance ($L_{inj}$) connected by one pole to the first center point of the first bridge arm, and by another pole to the third center point of the third bridge arm;
      a monitoring-control unit configured to control a state of the first, second, third, fourth, fifth and sixth switches, each of the first, second, third, fourth, fifth and sixth switches being configured to be alternately turned ON or OFF, the monitoring-control unit being configured to implement a control cycle of the first, second, third, fourth, fifth and sixth switches comprising the following steps:
         (101) setting the first switch to ON, at a first instant ($t_0$);
         (102) setting the fourth switch (D) to OFF, at a second instant ($t_2$) of the control cycle;
         (103) setting the third switch to ON, at a third instant ($t_3$) of the control cycle;
         (104) setting the first switch to OFF at a fourth instant ($t_4$) of the control cycle;
         (105) setting the second switch to ON, at a fifth instant ($t_6$) of the control cycle;
         (106) setting the third switch (C) to OFF, at a sixth instant ($t_7$) of the control cycle;
         (107) setting the fourth switch (D) to ON, at a seventh instant ($t_8$) of the control cycle;
         (108) setting the second switch to OFF, at an eighth instant ($t_9$) of the control cycle;
      the control cycle further comprising the following steps:
         (109) setting the sixth switch to ON at a first injection instant ($t_{3inj}$) comprised between the third instant ($t_3$) and the fourth instant ($t_4$) such that an injection voltage is applied between poles of the injection inductance ($L_{inj}$) for an injection duration ($t_{cmd\_inj}$), until a fourth instant ($t_4$) of the control cycle, and that at the fourth instant ($t_4$) of the control cycle an injection current ($I_{Linj}$) flows in the injection inductance ($L_{inj}$), the injection current ($I_{Linj}$) being greater than a predetermined minimum current;
         (110) setting the sixth switch to OFF at the fourth instant ($t_4$);
         (111) setting the fifth switch to ON at a second injection instant ($t_{8inj}$) comprised between the seventh instant ($t_8$) and the eighth instant ($t_9$) such that an injection voltage is applied between poles of the injection inductance ($L_{inj}$) during the injection duration ($t_{cmd\_inj}$), until the eighth instant ($t_9$) of the control cycle, and such that at the eighth instant ($t_9$) of the control cycle an injection current ($I_{Linj}$) flows in the injection inductance ($L_{inj}$), the injection current ($I_{Linj}$) being greater than a predetermined minimum injection current;
         (112) setting the fifth switch to OFF at the eighth instant ($t_9$);
         (113) repeating steps (101 to 112) of the control cycle from a ninth instant ($t_{10}$).

2. The method according to claim 1, wherein the first instant ($t_0$) is determined as a function of a moment when the diode associated with the respective terminals of the first switch is in conduction, such that a voltage across the terminals of the first switch is zero.

3. The method according to claim 2 wherein:
the second instant ($t_2$) of the control cycle is offset from the first instant ($t_0$) by a first time offset, depending on a phase shifting (Ph) between the first and second bridge arms, and on a duration (T) of a complete control cycle;
the third instant ($t_3$) of the control cycle is offset from the first instant ($t_0$) by a second time offset depending on the first time offset and on a first dead time ($t_{mort\_C\_D}$);
the fourth instant ($t_4$) of the control cycle is offset from the first instant ($t_0$) by a third time offset depending on a duration (T/2) of a complete half-cycle and a second dead time ($t_{mort\_A\_B}$);
the fifth instant ($t_6$) of the control cycle is offset from the first instant ($t_0$) by a fourth time offset depending on the duration (T/2) of a complete half-cycle;
the sixth instant ($t_7$) of the control cycle is offset from the first instant ($t_0$) by a fifth time offset depending on the phase shifting (Ph) and on the duration T/2 of a complete half-cycle;
the seventh instant ($t_8$) of the control cycle is offset from the first instant ($t_0$) by a sixth time offset depending on the phase shifting Ph and on the duration T/2 of a complete half cycle and the first dead time ($t_{mort\_C\_D}$);
the eighth instant ($t_9$) of the control cycle is offset from the first instant ($t_0$) by a seventh time offset depending on the duration (T) of a complete control cycle and the second dead time ($t_{mort\_A\_B}$).

4. A converter comprising a primary circuit and a secondary circuit, the converter being configured to convert an input voltage ($V_{in}$) between two input terminals of the primary circuit into an output voltage ($V_{out}$) between output terminals of the secondary circuit, the primary circuit comprising:
a first bridge arm consisting of a first switch and a second switch, the first switch and the second switch being connected in series between the input terminals of the primary circuit, a first center point of the first bridge arm designating an intermediate connection point between the first switch and the second switch;
a second bridge arm consisting of a third switch and a fourth switch, the third switch and the fourth switch being connected in series between the two input terminals of the primary circuit, a second center point of the second bridge arm designating an intermediate connection point between the third switch and the fourth switch, the second bridge arm being connected in parallel with the first bridge arm between the input terminals of the primary circuit;
a primary coil of the primary circuit, the primary coil comprising a leakage inductance, the primary coil being coupled by mutual induction to a secondary coil of the secondary circuit, the primary coil being connected by one pole to the first center point of the first bridge arm, and by another pole to the second center point of the second bridge arm;
the primary circuit further comprising:
a capacitor disposed in parallel between respective terminals of each of the first, second, third and fourth switches;
a third bridge arm consisting of a fifth switch and a sixth switch, the fifth switch and the sixth switch being connected in series between the input terminals of the primary circuit, a third center point of the third bridge arm designating an intermediate connection point between the fifth switch and the sixth switch, the third bridge arm being connected in parallel with the first and second bridge arms between the input terminals of the primary circuit;
each of the first, second, third, fourth, fifth and sixth switches being associated with a diode connected to the respective terminals of each of the first, second, third, fourth switches, and respective terminals of each of the fifth and sixth switches;
an injection inductance ($L_{inj}$) connected by one pole to the first center point of the first bridge arm, and by another pole to the third center point of the third bridge arm;
a monitoring-control unit configured to control a state of the first, second, third, fourth, fifth and sixth switches, each switch of the first, second, third, fourth, fifth and sixth switches being configured to be alternately turned ON or OFF, the monitoring-control unit being configured to implement a control cycle of the first, second, third, fourth, fifth and sixth switches comprising the following steps:
(101) setting the first switch to ON, at a first instant ($t_0$);
(102) setting the fourth switch (D) to OFF, at a second instant ($t_2$) of the control cycle;
(103) setting the third switch to ON, at a third instant ($t_3$) of the control cycle;
(104) setting the first switch to OFF at a fourth instant ($t_4$) of the control cycle;
(105) setting the second switch to ON, at a fifth instant ($t_6$) of the control cycle;
(106) setting the third switch (C) to OFF, at a sixth instant ($t_7$) of the control cycle;
(107) setting the fourth switch (D) to ON, at a seventh instant ($t_8$) of the control cycle;
(108) setting the second switch to OFF, at an eighth instant ($t_9$) of the control cycle;
the control cycle further comprising the following steps:
(109) setting the sixth switch to ON at a first injection instant ($t_{3inj}$) comprised between the third instant ($t_3$) and the fourth instant ($t_4$) such that an injection voltage is applied between poles of the injection inductance ($L_{inj}$) for an injection duration ($t_{cmd\_inj}$), until a fourth instant ($t_4$) of the control cycle, and that at the fourth instant ($t_4$) of the control cycle an injection current ($I_{Linj}$) flows in the injection inductance ($L_{inj}$), the injection current ($I_{Linj}$) being greater than a predetermined minimum current;
(110) setting the sixth switch to OFF at the fourth instant ($t_4$);
(111) setting the fifth switch to ON at a second injection instant ($t_{8inj}$) comprised between the seventh instant ($t_8$) and the eighth instant ($t_9$) such that an injection voltage is applied between poles of the injection inductance ($L_{inj}$) during the injection duration ($t_{cmd\_inj}$), until the eighth instant ($t_9$) of the control cycle, and such that at the eighth instant ($t_9$) of the control cycle an injection current ($I_{Linj}$) flows in the injection inductance ($L_{inj}$), the injection current ($I_{Linj}$) being greater than a predetermined minimum injection current;
(112) setting the fifth switch to OFF at the eighth instant ($t_9$);
(113) repeating steps (101 to 112) of the control cycle from a ninth instant ($t_{10}$).

5. The converter according to claim 4 wherein the secondary circuit comprises:
- a fourth bridge arm consisting of a seventh switch and an eighth switch, the seventh switch and the eighth switch being connected in series between respective terminals of the secondary coil of the secondary circuit, a fourth center point of the fourth bridge arm designating an intermediate connection point between the seventh switch and the eighth switch;
- a fifth bridge arm consisting of a first inductance and a second inductance, the first inductance and the second inductance being connected in series between the respective terminals of the secondary coil of the secondary circuit, a fifth center point of the fifth bridge arm designating an intermediate connection point between the first inductance and the second inductance, the fifth bridge arm being connected in parallel with the fourth bridge arm between the terminals of the secondary coil;
- the fourth center point being attached to an output terminal of the secondary circuit, and the fifth center point being attached to another output terminal of the secondary circuit.

6. The converter according to claim 5, wherein the secondary circuit further comprises a capacitor disposed between the output terminal and the other output terminal of the secondary circuit.

7. The converter according to claim 4, wherein the first instant ($t_0$) is determined as a function of a moment when the diode associated with the first switch is in conduction, such that a voltage across the respective terminals of the first switch is zero.

8. The converter according to claim 4, wherein:
- the second instant ($t_2$) of the control cycle is offset from the first instant ($t_0$) by a first time offset, depending on a phase shifting (Ph) between the first and second bridge arms, and on a duration (T) of a complete control cycle;
- the third instant ($t_3$) of the control cycle is offset from the first instant ($t_0$) by a second time offset depending on the first time offset and on a first dead time ($t_{mort\_C\_D}$);
- the fourth instant ($t_4$) of the control cycle is offset from the first instant ($t_0$) by a third time offset depending on a duration (T/2) of a complete half-cycle and a second dead time ($t_{mort\_A\_B}$);
- the fifth instant ($t_6$) of the control cycle is offset from the first instant ($t_0$) by a fourth time offset depending on the duration (T/2) of a complete half-cycle;
- the sixth instant ($t_7$) of the control cycle is offset from the first instant ($t_0$) by a fifth time offset depending on the phase shifting (Ph) and on the duration T/2 of a complete half-cycle;
- the seventh instant ($t_8$) of the control cycle is offset from the first instant ($t_0$) by a sixth time offset depending on the phase shifting (Ph) and on the duration T/2 of a complete half cycle and the first dead time ($t_{mort\_C\_D}$);
- the eighth instant ($t_9$) of the control cycle is offset from the first instant ($t_0$) by a seventh time offset depending on the duration (T) of a complete control cycle and the second dead time ($t_{mort\_A\_B}$).

9. The converter according to claim 7, wherein:
- the second instant ($t_2$) of the control cycle is offset from the first instant ($t_0$) by a first time offset, depending on a phase shifting (Ph) between the first and second bridge arms, and on a duration (T) of a complete control cycle;
- the third instant ($t_3$) of the control cycle is offset from the first instant ($t_0$) by a second time offset depending on the first time offset and on a first dead time ($t_{mort\_C\_D}$);
- the fourth instant ($t_4$) of the control cycle is offset from the first instant ($t_0$) by a third time offset depending on a duration (T/2) of a complete half-cycle and a second dead time ($t_{mort\_A\_B}$);
- the fifth instant ($t_6$) of the control cycle is offset from the first instant ($t_0$) by a fourth time offset depending on the duration (T/2) of a complete half-cycle;
- the sixth instant ($t_7$) of the control cycle is offset from the first instant ($t_0$) by a fifth time offset depending on the phase shifting (Ph) and on the duration T/2 of a complete half-cycle;
- the seventh instant ($t_8$) of the control cycle is offset from the first instant ($t_0$) by a sixth time offset depending on the phase shifting (Ph) and on the duration T/2 of a complete half cycle and the first dead time ($t_{mort\_C\_D}$);
- the eighth instant ($t_9$) of the control cycle is offset from the first instant ($t_0$) by a seventh time offset depending on the duration (T) of a complete control cycle and the second dead time ($t_{mort\_A\_B}$).

10. The converter according to claim 5, wherein the first instant ($t_0$) is determined as a function of a moment when the diode associated with the first switch is in conduction, such that a voltage across the respective terminals of the first switch is zero.

11. The converter according to claim 5, wherein:
- the second instant ($t_2$) of the control cycle is offset from the first instant ($t_0$) by a first time offset, depending on a phase shifting (Ph) between the first and second bridge arms, and on a duration (T) of a complete control cycle;
- the third instant ($t_3$) of the control cycle is offset from the first instant ($t_0$) by a second time offset depending on the first time offset and on a first dead time ($t_{mort\_C\_D}$);
- the fourth instant ($t_4$) of the control cycle is offset from the first instant ($t_0$) by a third time offset depending on a duration (T/2) of a complete half-cycle and a second dead time ($t_{mort\_A\_B}$);
- the fifth instant ($t_6$) of the control cycle is offset from the first instant ($t_0$) by a fourth time offset depending on the duration (T/2) of a complete half-cycle;
- the sixth instant ($t_7$) of the control cycle is offset from the first instant ($t_0$) by a fifth time offset depending on the phase shifting (Ph) and on the duration T/2 of a complete half-cycle;
- the seventh instant ($t_8$) of the control cycle is offset from the first instant ($t_0$) by a sixth time offset depending on the phase shifting (Ph) and on the duration T/2 of a complete half cycle and the first dead time ($t_{mort\_C\_D}$);
- the eighth instant ($t_9$) of the control cycle is offset from the first instant ($t_0$) by a seventh time offset depending on the duration (T) of a complete control cycle and the second dead time ($t_{mort\_A\_B}$).

12. The converter according to claim 10, wherein:
- the second instant ($t_2$) of the control cycle is offset from the first instant ($t_0$) by a first time offset, depending on a phase shifting (Ph) between the first and second bridge arms, and on a duration (T) of a complete control cycle;
- the third instant ($t_3$) of the control cycle is offset from the first instant ($t_0$) by a second time offset depending on the first time offset and on a first dead time ($t_{mort\_C\_D}$);

the fourth instant ($t_4$) of the control cycle is offset from the first instant ($t_0$) by a third time offset depending on a duration (T/2) of a complete half-cycle and a second dead time ($t_{mort\_A\_B}$);

the fifth instant ($t_6$) of the control cycle is offset from the first instant ($t_0$) by a fourth time offset depending on the duration (T/2) of a complete half-cycle;

the sixth instant ($t_7$) of the control cycle is offset from the first instant ($t_0$) by a fifth time offset depending on the phase shifting (Ph) and on the duration T/2 of a complete half-cycle;

the seventh instant ($t_8$) of the control cycle is offset from the first instant ($t_0$) by a sixth time offset depending on the phase shifting (Ph) and on the duration T/2 of a complete half cycle and the first dead time ($t_{mort\_C\_D}$);

the eighth instant ($t_9$) of the control cycle is offset from the first instant ($t_0$) by a seventh time offset depending on the duration (T) of a complete control cycle and the second dead time ($t_{mort\_A\_B}$).

13. The converter according to claim 6, wherein the first instant ($t_0$) is determined as a function of a moment when the diode associated with the first switch is in conduction, such that a voltage across the respective terminals of the first switch is zero.

14. The method according to claim 6, wherein:

the second instant ($t_2$) of the control cycle is offset from the first instant ($t_0$) by a first time offset, depending on a phase shifting (Ph) between the first and second bridge arms, and on a duration (T) of a complete control cycle;

the third instant ($t_3$) of the control cycle is offset from the first instant ($t_0$) by a second time offset depending on the first time offset and on a first dead time ($t_{mort\_C\_D}$);

the fourth instant ($t_4$) of the control cycle is offset from the first instant ($t_0$) by a third time offset depending on a duration (T/2) of a complete half-cycle and a second dead time ($t_{mort\_A\_B}$);

the fifth instant ($t_6$) of the control cycle is offset from the first instant ($t_0$) by a fourth time offset depending on the duration (T/2) of a complete half-cycle;

the sixth instant ($t_7$) of the control cycle is offset from the first instant ($t_0$) by a fifth time offset depending on the phase shifting (Ph) and on the duration T/2 of a complete half-cycle;

the seventh instant ($t_8$) of the control cycle is offset from the first instant ($t_0$) by a sixth time offset depending on the phase shifting (Ph) and on the duration T/2 of a complete half cycle and the first dead time ($t_{mort\_C\_D}$);

the eighth instant ($t_9$) of the control cycle is offset from the first instant ($t_0$) by a seventh time offset depending on the duration (T) of a complete control cycle and the second dead time ($t_{mort\_A\_B}$).

15. The converter according to claim 13, wherein:

the second instant ($t_2$) of the control cycle is offset from the first instant ($t_0$) by a first time offset, depending on a phase shifting (Ph) between the first and second bridge arms, and on a duration (T) of a complete control cycle;

the third instant ($t_3$) of the control cycle is offset from the first instant ($t_0$) by a second time offset depending on the first time offset and on a first dead time ($t_{mort\_C\_D}$);

the fourth instant ($t_4$) of the control cycle is offset from the first instant ($t_0$) by a third time offset depending on a duration (T/2) of a complete half-cycle and a second dead time ($t_{mort\_A\_B}$);

the fifth instant ($t_6$) of the control cycle is offset from the first instant ($t_0$) by a fourth time offset depending on the duration (T/2) of a complete half-cycle;

the sixth instant ($t_7$) of the control cycle is offset from the first instant ($t_0$) by a fifth time offset depending on the phase shifting (Ph) and on the duration T/2 of a complete half-cycle;

the seventh instant ($t_8$) of the control cycle is offset from the first instant ($t_0$) by a sixth time offset depending on the phase shifting (Ph) and on the duration T/2 of a complete half cycle and the first dead time ($t_{mort\_C\_D}$);

the eighth instant ($t_9$) of the control cycle is offset from the first instant ($t_0$) by a seventh time offset depending on the duration (T) of a complete control cycle and the second dead time ($t_{mort\_A\_B}$).

\* \* \* \* \*